United States Patent Office 2,846,612
Patented Aug. 5, 1958

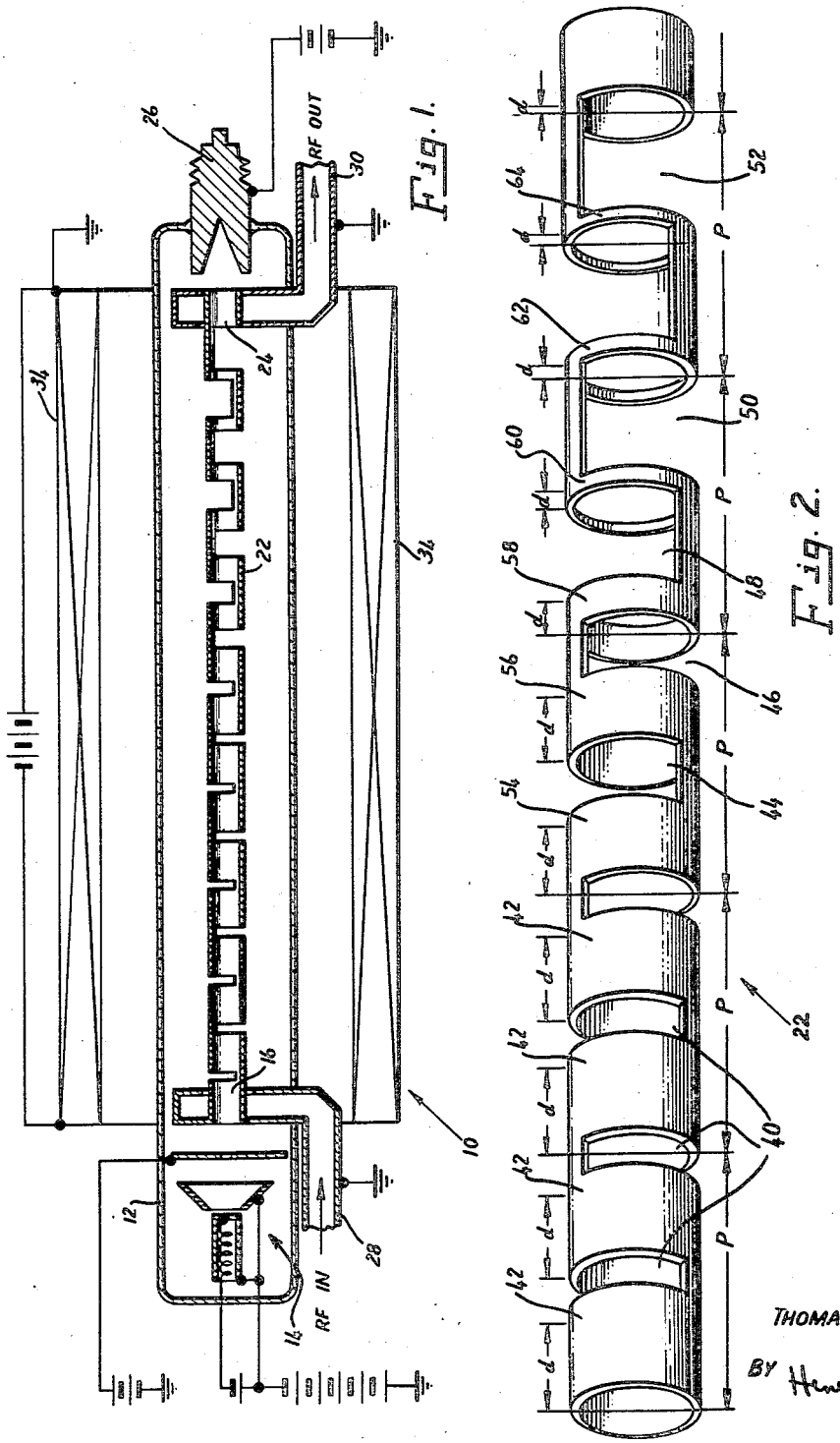

2,846,612

TRAVELING WAVE TUBE SLOW-WAVE STRUCTURE

Thomas E. Everhart, Santa Monica, Calif., assignor to Hughes Aircraft Company, Culver City, Calif., a corporation of Delaware Application July 11, 1955, Serial No. 521,017

6 Claims. (Cl. 315—3.5)

This invention relates generally to traveling wave tubes, and more particularly to a high efficiency slow-wave structure for such tubes.

The efficiency of a traveling wave tube depends upon the fraction of energy which can be converted from the kinetic energy of the electron beam to the energy in the wave traveling down the circuit, e. g. a helix, and obtainable from the output. If the phase velocity of the wave traveling along the circuit is constant, a certain maximum energy can be extracted from the electron beam, i. e. the electrons give up energy to the traveling wave until they are slowed down to the point that they begin to be accelerated by the traveling wave and thus begin to extract energy from the circuit. In other words, the electrons of the beam get out of phase with respect to the wave and are extracting energy from instead of delivering energy to the traveling wave.

This problem has been solved in the past by progressively lowering the phase velocity of the traveling wave along the circuit beginning at a point where the electrons would otherwise get appreciably out of phase. By thus slowing down the wave along its path the electrons are able to keep "pushing" it, and continue to give up energy to the traveling wave even after the electrons have been appreciably decelerated.

In the past this variation of phase velocity of the wave was achieved by merely "compressing the spring" of the helix; and this has provided certain advantages over the former circuits having a constant pitch helix by providing a decreasing phase velocity along the length of the tube. By so compressing the spring, the pitch, i. e. the length of a period of the turns of the spring, is inherently altered and this deleteriously affects certain traveling wave tube parameters, such as impedance, which depend upon the pitch.

It is, therefore, an object of the present invention to provide a slow-wave structure which achieves high efficiency by varying the phase velocity of the wave traveling along the slow-wave circuit.

It is another object of the invention to provide a slow-wave structure in which the phase velocity of the wave varies in accordance with the velocity of the electron stream adjacent thereto in a manner such that the pitch of the circuit remains constant throughout its length.

It is a further object of the invention to provide a slow-wave structure providing a varying phase velocity of the wave which does not deleteriously affect other traveling wave tube parameters such as impedance.

It is still a further object of the invention to provide a slow-wave structure of the type referred to which is easy to fabricate, to adjust, and to adapt to particular needs which arise during experimentation and research.

Briefly, in accordance with this invention, these objects are achieved in the following manner. A contrawound "helix" of the type which comprises a cylindrical tube having alternate opposing slots is the basic structure utilized in this invention. This basic type of helix is disclosed and described in the copending application of Charles K. Birdsall, High Power Microwave Tube, Serial No. 450,987, filed August 19, 1954, assigned to the assignee of the present application, and this structure has become well known in the art. In accordance with the present invention, identical alternately opposing slots are milled or otherwise provided in a conductive tube with a certain pitch P which is constant throughout the length of the tube there being distances $d$ between adjacent slots which are constant from the input of the tube to the point at which the electron beam begins to appreciably slow down; and from that point on the distance $d$ would be made gradually smaller while keeping the pitch P constant. (The distance $d$ is the width of metal between the slots and the ratio $d/P$ is a well known parameter in traveling wave tube art.) Thus the ratio $d/P$ is increasingly decreased toward the output end of the tube while keeping the pitch constant.

The novel features which are believed to be characteristic of the invention, both as to its organization and method of operation, together with further objects and advantages thereof, will be better understood from the following description considered in accordance with the accompanying drawing in which an embodiment of the invention is illustrated by way of example. It is to be expressly understood, however, that the drawing is for the purpose of illustration and description only, and is not intended as a definition of the limits of the invention.

In the drawing:

Fig. 1 is a sectional, schematic view of a traveling wave tube embodying the slow-wave structure of this invention; and Fig. 2 is a more detailed perspective view of the actual slow-wave structure of this invention.

Referring to the drawing, in Fig. 1, a traveling wave tube 10 is shown comprising an evacuated envelope 12 having an electron gun 14 disposed within its left end. Electron gun 14 is employed to produce a stream of electrons which is projected lengthwise toward the right of the envelope 12.

In the direction of electron flow from electron gun 14 there is shown disposed within the envelope 12 input end ferrule 16 which is connected to the slow-wave structure comprising a contrawound bifilar "helix" 22. At the right end of conductive helix 22 an output end ferrule 24 is shown connected to helix 22. A collector electrode 26 is disposed at the right hand end of envelope 12 to intercept the stream electrons projected through the conductive helix 22 by electron gun 14. An input waveguide 28 is coupled to the input, left hand end of conductive helix 22. An output waveguide 30 is shown coupled to the output end of conductive helix 22. The input and output waveguides are adapted to feed R. F. energy into and out of, respectively, helix 22 in a manner well known in the art. A focusing solenoid 34 is shown disposed concentrically about the envelope 12 to constrain or confine the electron stream along and within the conductive helix.

Referring to Fig. 2, there is shown a slow-wave structure, or helix 22, in accordance with this invention which may consist of a conductive tube 38 from which have been cut slots 40 to leave conductive interconnected sections. The first four sections 42 are of equal width. The distance $d$ indicates the width of all sections. The pitches P shown along the length of the tube are all equal. Though the pitch P remains constant, the slots beginning with slot 44 between the fourth and fifth sections are progressively wider; and the "tape" width, that is, the width $d$ of the sections accordingly becomes progressively smaller toward the right. Slots 44 through 52 are, therefore, successively wider and conductive segments 54 through 64 are successively narrower. The varying $d$ which represents the width of each conductive segment accordingly becomes progressively smaller beyond the end of the second pitch, that is, beyond section 54.

The exact point at which the distances $d$ are made smaller depends upon many of the parameters of the particular traveling wave tube, but more particularly the point chosen is that at which the electron beam begins appreciably to slow down. The rate at which the electron beam continues to slow down beyond that point determines, of course, the desired phase velocity variation of the electromagnetic wave. In a practical embodiment in which the frequency range of interest is from about 2.0 to 2.8 kilomegacycles per second, changing from a $d/P$ ratio of $3/8$ to a $d/P$ ratio of $1/8$ results in approximately a 37 percent change in phase velocity. With such a change in phase velocity, an increase in efficiency of approximately 42 percent has been realized; the efficiency of a traveling wave tube being a measure of the transfer of energy from the electron beam to the traveling elctromagnetic wave.

In the operation of traveling wave tube amplifier 10, an input signal to be amplified is impressed upon input waveguide segment 28. A traveling wave is subsequently launched on the slow-wave structure 22 and the field of the wave interacts with the electron stream projected from gun 14. This interaction results in a transfer of energy from the stream to the wave causing the wave to "grow" or increase in amplitude as it progresses along slow-wave structure 22. At the end of the slow-wave structure, the amplified wave energy is coupled from output waveguide segment 30 to a utilization device, not shown.

As the beam progresses along the slow-wave structure 22 it begins to slow down appreciably at the end of the second period of the helix. In accordance with the present invention, at that point, in order that the electrons will continue to deliver energy to the wave traveling along the helix, the $d/P$ ratio is also made to decrease such that the electrons even though appreciably decelerated will continue to "push" the traveling wave because its phase velocity is correspondingly slowed down to keep in "pushing" phase with the electron beam.

There has thus been disclosed a traveling wave tube slow-wave structure which greatly increases the efficiency which has previously been obtained in slow-wave structures. The slow-wave structure can be varied according to any desired arbitrary formula. The slow-wave structure of the invention is easier to manufacture than the conventional structures and may be easily and accurately adapted and adjusted for use especially in research experimentation or instrumentation. This ease of adaptation along with its other advantages of not deleteriously affecting other traveling wave tube parameters, such as impedance, flows from changing the tape width while holding the pitch constant.

What is claimed is:

1. A traveling wave tube adapted for propagating electromagnetic waves therethrough and for effecting an interchange of energy between an electron beam and the electromagnetic waves, the tube comprising: an electron emitter; an electron collector, said emiter and collector being spaced apart; means for projecting a beam of electrons along a predetermined path between said emitter and said collector; a hollow, periodic slow-wave structure of constant pitch disposed along and enclosing a portion of said path, said slow-wave structure including a plurality of axially registering and axially spaced conductive rings, the axial lengths of which decrease toward the collector end of said slow-wave structure thereby to vary the phase velocity of the electromagnetic waves traveling along its length in a manner such that the traveling waves are slowed down whereby the electron beam continues to deliver energy to the traveling waves throughout the length of said slow-wave structure.

2. A traveling wave tube amplifier for propagating electromagnetic waves along a hollow, slow-wave structure and for effecting an interchange of energy between the waves and an electron stream projected along and within the hollow, slow-wave structure, said amplifier comprising: electron stream producing means; electron collector means, said stream producing means and said collector means being spaced apart and being adapted respectively to emit and collect a stream of electrons traversing a predetermined path between said stream producing means and said collector means; and a hollow, conducting, periodic slow-wave structure disposed about and along a portion of said path and being adapted to vary the phase velocity of the waves propagated thereon in a manner such that the phase velocity of said waves remains substantially in a predetermined relationship with respect to the velocity of the electrons in said stream throughout the length of said portion of said path, said slow-wave structure including a series of axially registering conductive rings, one in each period, the axial length of said rings decreasing along the length of said slow-wave structure toward said collector means in a manner such that the pitch $P$ of said slow-wave structure remains constant throughout its length while changing the $d/P$ ratio according to a predetermined relationship, where $d$ is the width of the conductor in said slow-wave structure and $P$ is the axial length of the recurring periods of said periodic slow-wave structure.

3. A traveling wave tube type amplifier comprising: means for developing and projecting an electron stream along a predetermined path; a slow-wave structure of the character adapted to conduct a radio-frequency wave to be amplified along the length of the slow-wave structure with a phase velocity such that the electron stream of the traveling wave tube delivers its kinetic energy to the traveling wave, and being further adapted to cause the phase velocity of the traveling wave to slow down in such a manner that as the electrons are decelerated they continue to deliver energy to the traveling wave throughout the length of the slow-wave structure, said slow-wave structure including a plurality of axially spaced conductive cylinders disposed concentrically about said path of the electron stream and conductive, connecting members electrically interconnecting adjacent ones of said cylinders at diametrically opposed points on the ends of said cylinders, said cylinders and said connecting members being disposed in a manner such that the pitch $P$ of the recurring pairs of cylinders and connecting members is constant while said conductive cylinders are progressively shorter in length toward the output end of said slow-wave structure, whereby the $d/P$ ratio decreases while the pitch remains constant, where $d$ is the length of each of said cylinders.

4. In a traveling wave tube type amplifier having means for developing and projecting an electron stream along a predetermined path, a slow-wave structure of the character adapted to conduct a radio-frequency wave to be amplified along the length of the slow-wave structure with a phase velocity such that the electron stream of the traveling wave tube delivers its kinetic energy to the traveling wave, and being further adapated to cause the phase velocity of the traveling wave to slow down in such a manner that as the electrons are decelerated they continue to deliver energy to the traveling wave throughout the length of the slow-wave structure, said slow-wave structure comprising: a plurality of axially spaced conductive cylinders disposed concentrically about the path of the electron stream; and conductive connecting members electrically interconnecting adjacent ones of said cylinders at diametrically opposed points on the ends of said cylinders, said cylinders and said connecting members being disposed in a manner such that the pitch $P$ of the recurring pairs of said cylinders and said connecting members is constant while said conductive cylinders are progressively shorter in length toward the output end of said slow-wave structure, whereby the $d/P$ ratio decreases while the pitch remains constant, where $d$ is the length of each of said cylinders.

5. In a traveling wave type amplifier, a slow-wave structure of the character which surrounds a projected electron stream and along which is propagated an electromagnetic wave to be amplified by derivation of energy from the electron stream, the slow-wave structure being also of the character adapted to provide a phase velocity in the traveling wave which decreases toward the output end of the slow-wave structure in a manner such that the phase velocity of the wave has a predetermined relationship with respect to the velocity of the electrons in the stream throughout the length of the slow-wave structure, the slow-wave structure comprising: a plurality of conducting cylinders of varying lengths aligned along the electron stream and electrically interconnected at diametrically opposed points on each pair of adjacent ones of said cylinders in a manner to form a structure electrically equivalent to a contrawound helix having a constant pitch, the cylinders being disposed in such a manner that they have progressively lesser length toward the output end of the electron stream.

6. In a traveling wave type amplifier, a slow-wave structure of the character which surrounds a projected electron stream and along which is propagated an electromagnetic wave to be amplified by derivation of energy from the electron stream, the slow-wave structure being also of the character adapted to provide a phase velocity in the traveling wave which decreases toward the output end of the slow-wave structure in a manner such that the phase velocity of the wave has a predetermined relationship with respect to the velocity of the electrons in the stream throughout the length of the slow-wave structure, the slow-wave structure comprising: a length of hollow conductive tubing from which alternately opposing slots have been removed in a manner whereby said length of conductive tubing is the electrical equivalent of a contrawound helix of constant pitch $P$ and has a decreasing $d/P$ ratio along said length of the conductive tubing, where $d$ is the distance between adjacent slots.

References Cited in the file of this patent

UNITED STATES PATENTS

| | | |
|---|---|---|
| 2,233,126 | Haeff | Feb. 25, 1941 |
| 2,541,843 | Tiley | Feb. 13, 1951 |
| 2,653,270 | Kompfner | Sept. 22, 1953 |

FOREIGN PATENTS

| | | |
|---|---|---|
| 1,006,336 | France | Jan. 23, 1952 |